United States Patent [19]

Duliba

[11] 4,077,285
[45] Mar. 7, 1978

[54] METHOD OF AND APPARATUS FOR MACHINING A CONTOURED SURFACE

[75] Inventor: Paul Duliba, Warren, Pa.

[73] Assignee: National Forge Company, Irvine, Pa.

[21] Appl. No.: 664,672

[22] Filed: Mar. 8, 1976

[51] Int. Cl.² ............................ B23B 1/00; B23B 3/28
[52] U.S. Cl. ..................................... 82/1 C; 82/14 B; 82/19
[58] Field of Search .................. 82/14 A, 1 C, 14 B, 82/14 C, 19

[56] References Cited

U.S. PATENT DOCUMENTS

| Re. 19,790 | 12/1935 | Lindgren | 113/52 |
|---|---|---|---|
| 1,768,272 | 6/1930 | Taylor | 82/19 |
| 1,901,035 | 3/1933 | Kelley et al. | 113/52 |
| 2,375,831 | 5/1945 | Turchan et al. | 82/14 A |
| 2,585,329 | 2/1952 | Johnson | 82/19 |
| 2,778,280 | 1/1957 | Trofimov | 82/14 B |
| 3,014,390 | 12/1961 | Garde et al. | 82/14 A |
| 3,212,370 | 10/1965 | Spriggs et al. | 82/14 R |
| 3,212,371 | 10/1965 | Banke | 82/14 A |
| 3,264,912 | 8/1966 | Hovis et al. | 82/14 A |
| 3,269,232 | 8/1966 | Hovis | 82/14 A |
| 3,478,626 | 11/1969 | Stelmach | 82/14 B |
| 3,603,184 | 9/1971 | Berly | 82/14 A |

FOREIGN PATENT DOCUMENTS

436,768  10/1935  United Kingdom.

Primary Examiner—Leonidas Vlachos
Attorney, Agent, or Firm—Ronald A. Schapira

[57] ABSTRACT

A method of and apparatus for machining a pre-selected contour in a surface of a workpiece, such as an end face of the workpiece. The workpiece is rotated on a lathe about its longitudinal axis and a cutting tool, mounted on a movable cross slide of the lathe, is positioned parallel to the longitudinal axis of the workpiece for cutting a contour into the workpiece end face. A probe, also mounted on the cross slide, is positioned perpendicular to the longitudinal axis of a pattern for continual contact with the outer surface of the pattern, which is being rotated about its longitudinal axis. Upon rotation of the pattern and workpiece and movement of the cross slide, the probe moves towards and away from the longitudinal axis of the pattern in accordance with a change in the distance from the point of probe contact with the pattern outer surface to the longitudinal axis of the pattern. A command potentiometer detects the distance and direction of probe movement and an electro-hydraulic servo system moves the cutting tool in response to direction from the potentiometer a proportional distance towards and away from the end face of the workpiece, whereby the cutting tool cuts a contour in the workpiece end face.

23 Claims, 7 Drawing Figures

METHOD OF AND APPARATUS FOR MACHINING A CONTOURED SURFACE

BACKGROUND OF THE INVENTION

This invention relates to a method of and apparatus for contouring a surface of a workpiece. More particularly, it relates to a method of and apparatus for machining a preselected contour in a surface of a generally cylindrical workpiece.

Particularly in the manufacture of a nuclear nozzle, it is necessary to contour a flat surface of the nozzle. A nuclear nozzle is generally cylindrical and has a flat end face, a nozzle portion, a body portion extending between the flat end face and nozzle portion, and thick walls defining an opening extending through the length of the nozzle. To mount the nozzle on a hollow, cylindrical device for delivering fluid from the device through the nozzle, the end face of the nozzle is generally mated with the cylindrical body portion of the device surrounding a fluid delivery opening made through the device body portion. To prevent ineffective mating of the nozzle with the device, the flat end face of the nozzle is contoured for a better sealing.

In the past, it has been known to contour the end face of the nozzle by duplicating the contour in a pre-prepared wood pattern or cam. A wood cam having essentially the same size and shape dimensions as the nozzle to be machined was first made. The cam was made so that its end face had the contour to be machined into the end face of the nozzle. The nozzle and cam were then mounted on one or more lathes for rotation about their respective longitudinal axes. A tracing mechanism was then placed in contact with the contoured end face of the cam, essentially parallel with the cam's longitudinal axis, and a cutting tool was positioned for cutting the end face of the nozzle, also essentially parallel with the nozzle's longitudinal axis. The tracing mechanism and cutting tool were electrically and/or mechanically connected, so that any movement of the tracing mechanism was mimicked by the cutting tool. Upon rotating the cam and nozzle and operating the tracing mechanism to follow the contour of the cam end face, the cutting tool similarly moved to cut the cam contour into the nozzle. Thus, the contour of the cam end face was duplicated in the nozzle end face.

The above described type of contouring operation has several disadvantages. First, if one is manufacturing several nozzles having different dimensions, then several wood cams must be prepared and stored. The difficulty of storage is readily appreciated because these cams and their mandrel are generally about 6 to 9 feet in length and 3 to 6 feet in diameter. Also, although wood may be the best material from which to prepare the cams, upon being stored they may tend to warp, whereby their reliabilty becomes questionable. Second, because of the cam size factor mentioned above, a cutting operation using a wood cam is more costly and less reliable than one in which a cam of the contouring apparatus of the present invention, discussed below, is used. For example, the time expended for arranging a large wood cam on a lathe and the cost of the raw wood from which the cam is made are greater than when the apparatus of the present invention is utilized. Also, it has been found that because of the difference in size between the wood cam and the tracing mechanism, instability or chatter of the tracing mechanism occurs during the tracing operation, which results in error in the contour being machined in the end face of the nozzle.

The apparatus of the present invention overcomes these disadvantages. The contouring apparatus of this invention includes a pattern, a mechanism for detecting changes in selected dimensions of the pattern, a cutting tool, and means for transmitting signals from the detecting mechanism, in response to the changes in the selected pattern dimensions, to the cutting tool for controlling the cutting depth of the tool into the end face of the nozzle being contoured.

The pattern of the apparatus of the present invention is pre-prepared having particular dimensions. However, the pattern of the present invention does not have the same dimensions as either the nozzle to be machined or any end face or surface having the contour to be machined into the end face of the nozzle. In the method of using the apparatus of the present invention, the contour being machined into the nozzle end face is not a duplication or tracing of any contour in the pattern, but rather is a reflection of the changes in selected dimensions of the pattern. Thus, the pattern of the present invention need not have the shape of the nozzle.

As is readily appreciated from the drawings of this invention, the pattern and nozzle are quite different in shape and size. Therefore, the disadvantage of having to make the pattern as large as the nozzle being machined is avoided as are the consequent problems discussed above related to pattern size. It has also been found that the pattern may be made from metal or other materials less expensive and more reliable than wood.

It is therefore an object of this invention to provide an apparatus for and method of contouring that are less expensive and more reliable than those known in the prior art.

Another object of this invention is to provide an apparatus for and method of contouring which require less time for preparation prior to the contouring operation than is presently required.

SUMMARY OF THE INVENTION

An apparatus for contouring the surface of a workpiece having an end face, the workpiece being rotated about its longitudinal axis, is provided. The apparatus includes means for rotating the workpiece, a pattern rotating machine, and a pattern mounted for rotation about its longitudinal axis on the pattern rotating machine. A cutting tool is positioned on a movable tool support for cutting the workpiece end face, the tool support being movable in a plane essentially normal to the longitudinal axis of the workpiece. A probe is positioned on a movable probe support for continual contact with the outer surface of the pattern. The probe is movable towards and away from the longitudinal axis of the pattern, upon rotation of the pattern, in accordance with a change in the distance from the point of probe contact with the pattern outer surface to the longitudinal axis of the pattern. The probe support is movable in a plane essentially parallel to the longitudinal axis of the pattern. The apparatus further includes means for detecting the distance and direction of probe movement towards and away from the longitudinal axis of the pattern and for moving the cutting tool a proportional distance towards and away from the end face of the workpiece, whereby the cutting tool cuts a contour in the workpiece end face.

A method of contouring a surface of a workpiece having an end face is provided. The method includes rotating the workpiece about its longitudinal axis, rotating a pattern about its longitudinal axis, and positioning a cutting tool on a movable tool support for cutting the workpiece end face. The method further includes positioning a probe on a movable probe support for continual contact with the outer surface of the pattern, the probe moving towards and away from the longitudinal axis of the pattern in accordance with a change in the distance from the point of probe contact with the pattern outer surface to the longitudinal axis of the pattern. The movable tool support is moved in a plane essentially normal to the longitudinal axis of the workpiece while the movable probe support is simultaneously moved in a plane essentially parallel to the longitudinal axis of the pattern. The method further includes detecting the distance and direction of probe movement towards and away from the longitudinal axis of the pattern and simultaneously moving the cutting tool a proportional distance towards and away from the end face of the workpiece, whereby the cutting tool cuts a contour in the workpiece end face.

DESCRIPTION OF THE PREFERRED EMBODIMENTS

Figure 1:
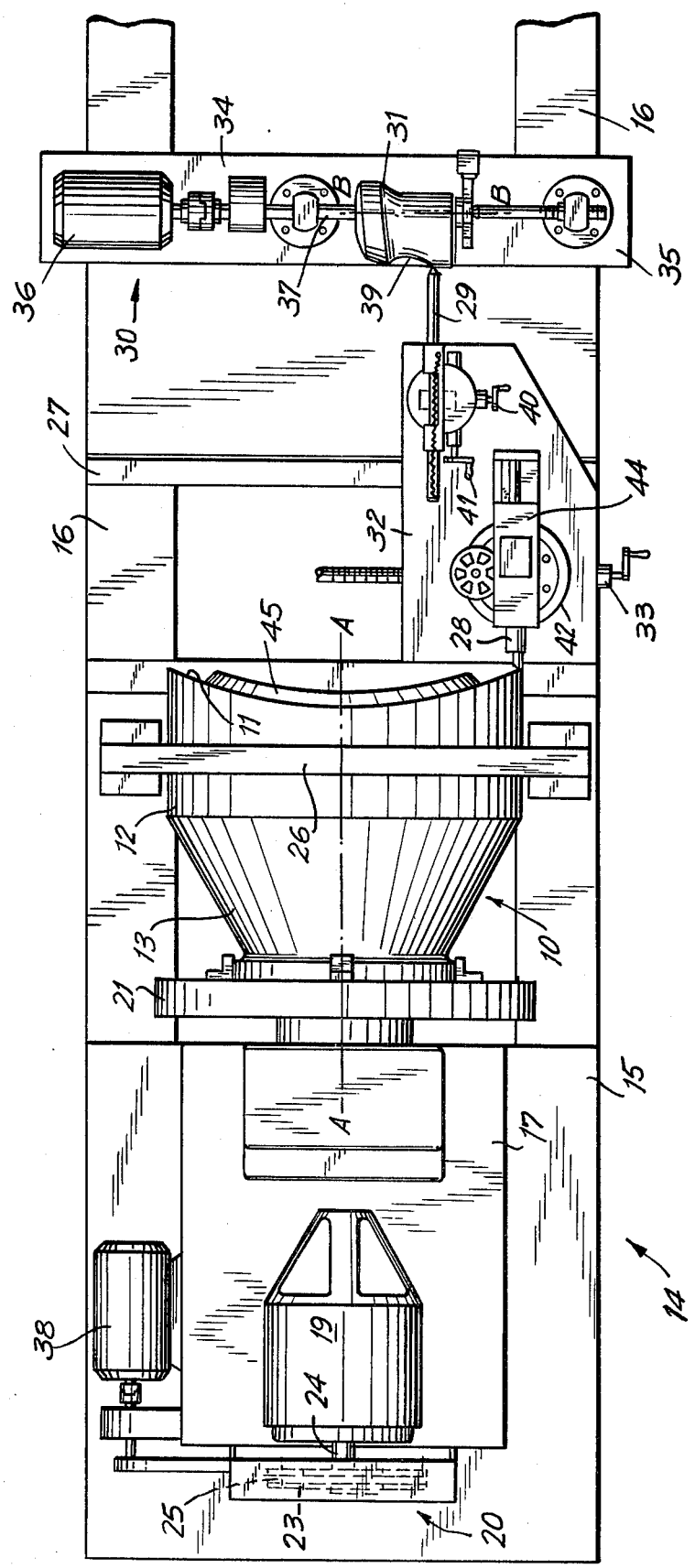
FIG. 1 is a top plan view of an embodiment of the contouring apparatus of the present invention, this view showing the workpiece and the position of the apparatus after completion of the contouring operation.
Figure 2:
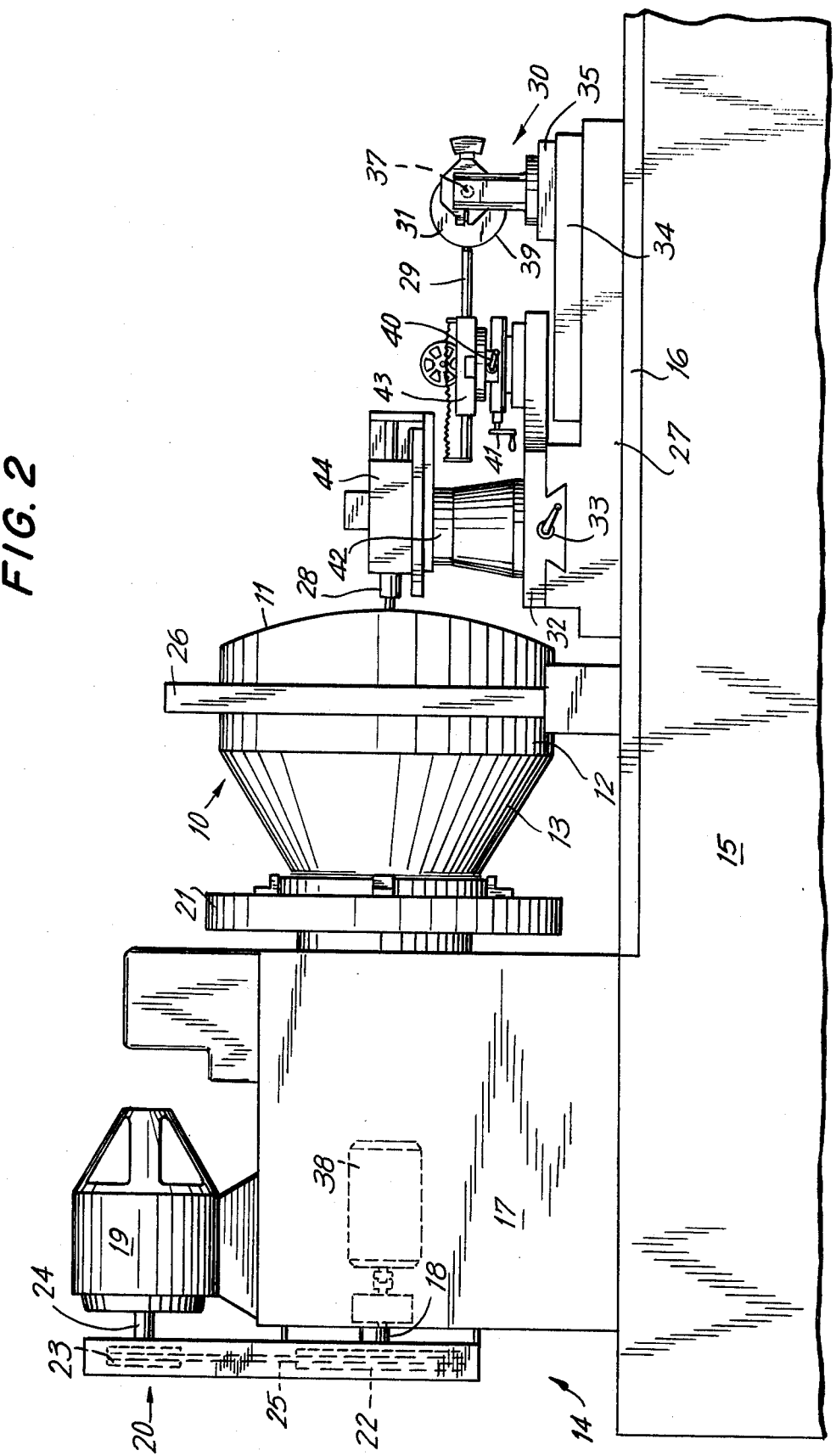
FIG. 2 is a side view of the apparatus shown in FIG. 1.

Referring to the drawings, FIGS. 1 and 2 illustrate an embodiment of the contouring apparatus of the present invention showing the workpiece, here a nozzle, generally indicated as 10, which has had its end face 11 contoured.

As discussed above, nozzle 10 is generally a hollow cylinder and has, in addition to end face 11, a body portion 12, a nozzle portion 13, and thick walls (not shown) which define an opening extending therethrough. Nozzle 10 will usually be made of a metal, such as steel, but a workpiece made of other materials and having other shapes can also be contoured using this invention. Nozzle 10 is mounted for rotation on a conventional lathe, generally indicated as 14. The detailed structure of lathe 14 will be understood by those skilled in the art and reference will be made below only to the details of its structure necessary for an understanding of the present invention.

Lathe 14 includes a base 15 upon which are mounted two tracks 16. As is apparent from FIGS. 1 and 2 and as will be apparent from the discussion below, the contouring apparatus of the present invention, excluding lathe 14, is mounted on tracks 16, either fixedly or movably, so that this apparatus may be positioned to contour end face 11 of nozzle 10.

Lathe 14 has means for mounting and rotating nozzle 10. The means include a headstock 17, a headstock main spindle 18, a motor 19, and a pulley system 20.

Headstock 17 is either integral with base 15 or fixedly attached thereto and provides support for the nozzle to be mounted on lathe 14. An opening (not shown) extends through headstock 17 from its front to its tail end in which headstock spindle 18 is conventionally mounted for rotation. As shown in FIG. 2, a portion of spindle 18 extends outwardly from the tail end of headstock 17 and similarly a portion (not shown) extends outwardly from the front end of headstock 17. Nozzle 10 is fixedly mounted by conventional means on the outermost front portion of spindle 18 and is stabilized on spindle 18 by conventional clamping means associated with a face plate 21, which face plate surrounds the outer surface of nozzle 10. The outermost tail portion of spindle 18 is in rotatable engagement with motor 19 through pulley system 20. Pulley system 20 includes a pulley wheel 22 fixedly journaled on the tail portion of spindle 18 and another pulley wheel 23 fixedly journaled on a second spindle 24 extending outwardly from motor 19. Arranged around wheels 22 and 23 in frictional engagement is a belt pulley 25. By operation of motor 19, pulley system 20 operates to rotate spindle 18 and the nozzle mounted thereon.

With regard to the remainder of the apparatus shown in FIGS. 1 and 2, straddling tracks 16 and mounted thereon is a workpiece steady rest 26, which supports and holds in place the front portion of nozzle 10. Thus, end face 11 of nozzle 10 is essentially disposed between tracks 16 in position for being contoured.

A lathe carriage 27, shown particularly in FIG. 2, supports a cutting tool 28, a probe 29, a pattern rotating machine generally indicated as 30, a three-dimensional pattern 31 mounted on the pattern rotating machine, and various other structures described below necessary for operation of the cutting tool, probe, and cam.

Lathe carriage 27 is movably mounted on tracks 16 so that it and the structures it supports may be moved towards and away from end face 11 of nozzle 10. Mounted on the tail end of carriage 27 is a cross slide 32, which is movable in a direction perpendicular to that of carriage 27. For example, cross slide 32 may be moved away from one track 16 towards the other track 16 by operation of the mechanical crank and threaded bolt device indicated at 33. As will be explained in greater detail below with regard to the method of using the contouring apparatus of the present invention, this cross movement capability of slide 32 allows the cutting tool 28 to be positioned at a desired point on the end face 11 of nozzle 10.

Integral with or attached to the front end or apron of carriage 27 is a first subplate 34. Mounted on subplate 34 is a second subplate 35. Subplates 34 and 35 essentially provide a base for the mounting of cam rotating machine 30 and cam 31.

As best shown in FIG. 1, cam rotating machine 30 includes a Selsyn receiver 36 and Selsyn generator 38, a pattern rotating shaft 37, and various structures for the mounting of pattern 31 on machine 30.

Selsyn receiver 36, when energized, rotates shaft 37, upon which pattern 31 is mounted. Receiver 36 is energized by Selsyn generator 38 mounted on the side of headstock 17, which is shown in dotted line in FIG. 2 and in solid line in FIG. 1. Generator 38 is driven by conventional means of connection with timing pulley system 20, which system as mentioned above is driven by motor 19. By either appropriate electrical and/or mechanical drive means connected between generator 38 and receiver 36, the rotation of nozzle 10 and pattern 31 is synchronized. The operation of Selsyn generators and receivers are well known in the art. The particular Selsyn devices found to be useful in the contouring apparatus of the present invention are identified as Type MJ, which are available from General Electric Company.

As mentioned above, also mounted on cross slide 32 of carriage 27 is a probe 29, which is positioned so that its point may contact at a selected angle a selected outer surface of pattern 31 indicated at 39.

Probe 29 may be moved away from and towards pattern surface 39 and the angle of contact of probe 29 with pattern surface 39 may be changed by operation of a compound slide 40 and a rotating base 41. Probe 29 is spring or weight loaded so that once it is set in contact with surface 39, the probe is maintained in continual contact with surface 39. Several conventional devices for positioning probe 29 in relation to pattern 31 can be utilized. It has been found that the rotating base 41 and compound slide 40 identified as Catalog No. 023-800R, which are available from Ralmikes Tool-A-Rama, are particularly useful in this invention.

Further as mentioned above, cutting tool 28 is mounted on cross slide 32 of carriage 27. Cutting tool 28 is mounted on a rotating base 42, so that its point can be set at any selected angle of contact with end face 11 of nozzle 10.

As will be discussed in detail below, once cutting tool 28 is positioned adjacent end face 11 of nozzle 10 and probe 29 is placed in contact with surface 39 of pattern 31, upon rotation of pattern 31, changes in selected dimensions of surface 39, particularly at the point of contact of probe 29, will cause movement of probe 29. The contouring apparatus of the present invention has means for automatically imitating the movement of probe 29 by cutting tool 28. However, it should be appreciated that the cutting tool 28 can be made to move the same distance as probe 29 or a proportional distance.

The latter means are "trim" potentiometers wired in series with the command and feed back potentiometers, for detecting the distance and direction of movement of probe 29 and translating this movement into an electrical signal, and an electro-hydraulic servo system, for receiving the electrical signal from the potentiometer and electrically operating the hydraulically activated tool 28 in response to the potentiometer signal.

The command potentiometer, indicated generally at 43, is electrically connected with the servo system, indicated generally at 44. Many of several well known potentiometers and servo systems may be used to operate tool 28 and probe 29. A potentiometer that has been found to be particularly useful is identified as Model 205, which is available from Computer Instrument Corporation. A servo system that has been found to be particularly useful is identified as Model EMP-A-11, which is available from Vickers Inc.

Several modifications to the apparatus described above are contemplated to be within the scope of this invention. Although the lathe and associated pattern, cutting tool, and probe mounting structures described above have been found to be particularly useful, other devices well known in the art may be utilized. For example, it is known in the art to automate the movement of a lathe carriage, cross slide, and devices mounted thereon. In this respect, once probe 29 and tool 28 have been positioned as desired adjacent respectively pattern 31 and end face 11 of nozzle 10, then automated means may be utilized for moving cross slide 32 between tracks 16, so that the probe moves along the length of pattern 31 and the cutting tool moves across the diameter of end face 11 in accordance with, for example, a desired rate of nozzle or cam rotation. U.S. Pat. No. 3,478,626 discloses one particular automated means for regulating carriage movement useful in conjunction with conventional lathes. Also, although Selsyn generators and receivers have been specified above for coordinating the rotation of nozzle 10 and cam 31, other well known devices could also be used within the context of this invention. Such other devices may either employ solely a mechanical connection between the generator and receiver or a combination of mechanical and electrical connections for this purpose.

As shown in FIG. 1, nozzle 10 is mounted on lathe 14 for rotation about its longitudinal axis, which axis is schematically shown as dotted line A-A. The longitudinal axis is that axis about which a structure is rotated, irrespective of the shape of the structure. With regard to nozzle 10, its longitudinal axis extends through end face 11, body portion 12, and nozzle portion 13 and through the center of the above mentioned opening defined by the thick walls of the nozzle. Thus, the longitudinal axis extends through the center of cylindrical end face 11. It is also apparent, for purposes of illustration, that upon placing cutting tool 28 against end face 11 at any selected radii from axis A—A and rotating nozzle 10, the tool will cut a circular groove in end face 11, the groove having its center at axis A—A. Thus, movement of tool 28 away from or towards end face 11 during a revolution of nozzle 10 will determine the depth of the groove cut into or, in other words, the material cut out of nozzle 10 at all points on that circular groove.

Preliminary to employing the contouring method of this invention, a contour of particular dimensions is calculated. It is within the skill of one versed in the art to calculate the dimensions of a desired contour, but it should be noted that such a calculation essentially involves, for instance with regard to circular end face 11, determining the depth of cut of tool 28 into end face 11 at any point with respect to the radii of the point from axis A—A. Analytical techniques are available for making these calculations. Further, this depth is essentially the distance moved by cutting tool 28 inward from the uncontoured surface 11 of nozzle 10 at any selected point on end face 11. Thus, the contour can be calculated in terms of depth or distances of movement for the purpose of preparing pattern 31.

Particularly as shown in FIG. 1, pattern 31 is mounted on pattern rotating machine 30 for rotation about its longitudinal axis, which axis is schematically shown as dotted line B—B. It is apparent that upon rotation of pattern 31, probe 29 will move both inward and outward, with respect to axis B—B, in accordance with the pre-selected dimensions of the portion of pattern 31 that the probe contacts. Thus, pattern 31 is prepared having dimensions which will result in the desired movement of probe 29 and a proportional movement of cutting tool 28. For a better understanding of the relation between the dimensions of pattern 31 and depth of movement of cutting tool 28 into nozzle 10, reference is made to FIGS. 4 and 5.

Figure 4:
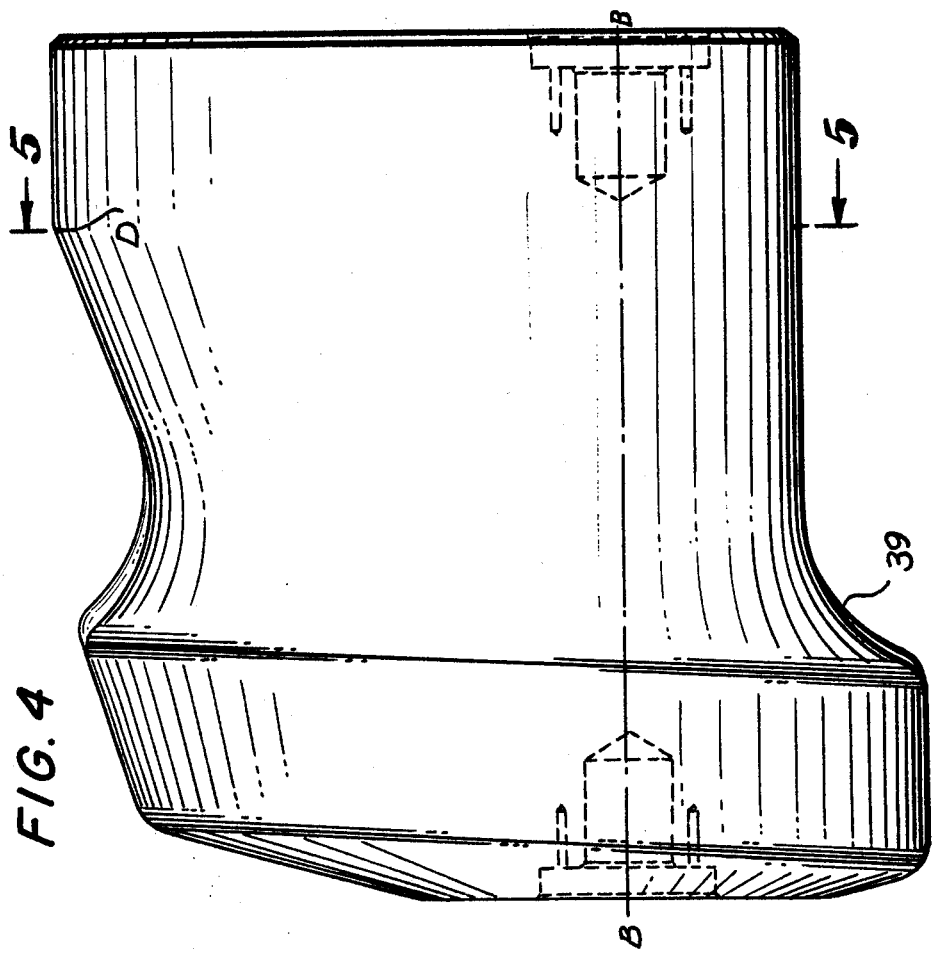
FIG. 4 is a top view of the pattern of the apparatus shown in FIGS. 1-3 after the pattern has been rotated 180°, this view showing the pattern enlarged for the purpose of discussion.

Pattern 31 is illustrated in FIG. 4. It is apparent that the selected outer surface 39 of pattern 31 which probe 29 contacts is irregular in shape. It is also apparent that if probe 29 were moved along the length of pattern 31, the probe would move inward towards and outward away from axis B—B, which movement would be imparted to cutting tool 28. Thus, cutting tool 28, in this instance, would cut a contour in end face 11 as it was similarly moved across the rotating nozzle 10 towards or away from axis A—A.

In comparing pattern 31 shown in FIG. 1 with FIG. 4, it is also apparent that the pattern has been rotated 180°. This rotation, schematically illustrated in FIG. 5 where pattern 31 is viewed from its end, aids in understanding how preparation of the pattern having preselected particular dimensions relates to pre-determined distances of movement of probe 28 and tool 29.

Figure 5:
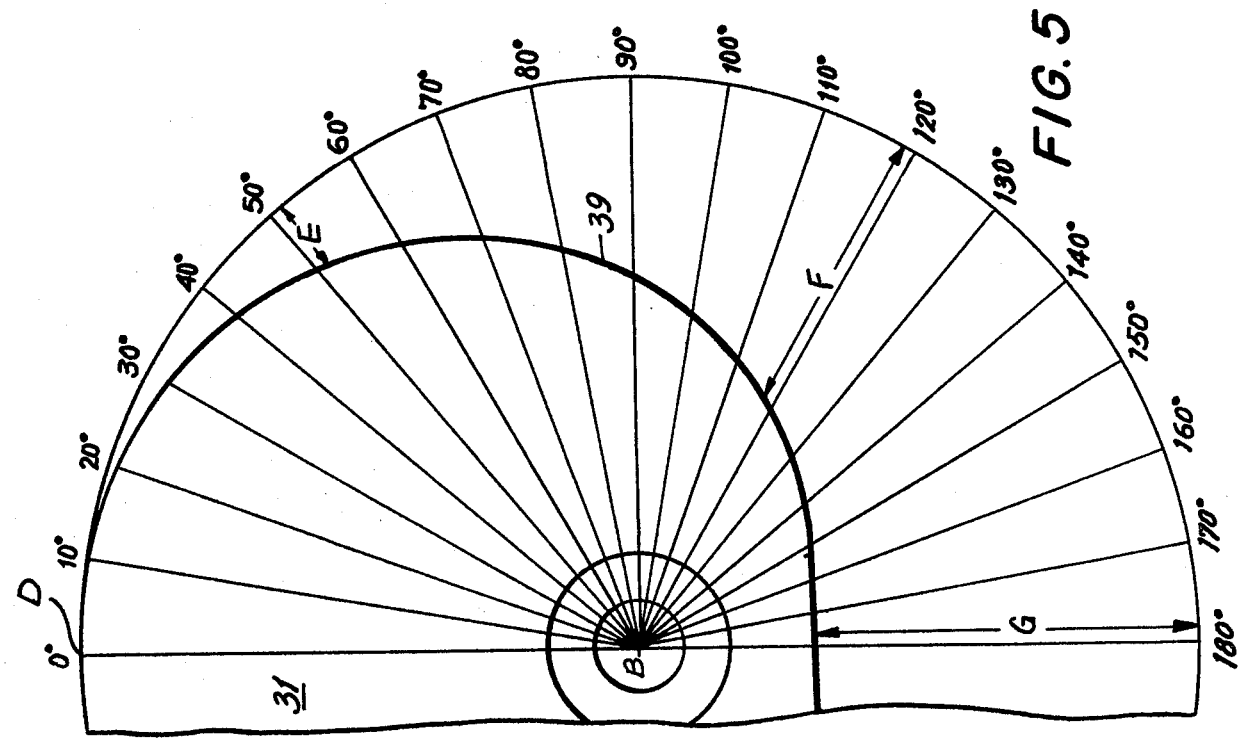
FIG. 5 is a schematic representation of an end view of the pattern taken along lines 5—5 of FIG. 4, this view showing particular dimensions of the pattern of FIG. 4 in relation to a circle circumscribed around the pattern and having its axis.

Selecting a point D on pattern 31 shown in FIG. 4, upon rotating the cam 180°, the outer surface of the pattern at that particular location along its length would be represented by line 39 in FIG. 5. It is apparent from FIG. 5 that the pattern at point D has a varying radius, and that the distance of one point on surface 39 to axis B—B is different than the distance from another point. Thus, if probe 29 were in continual contact with surface 39, the probe would move inwardly as pattern 31 were rotated 180°. By circumscribing a circle C—C (only partially shown) around surface 39, the change in position of probe 29 contacting surface 39 or the distance of movement of probe 29 at the various angles indicated on circle C—C is calculable. The distance of inward movement at each selected angle shown on circle C—C is the difference between circle C—C and surface 39 at each selected angle. For example, if probe 29 were initially placed at point D on cam 31, the probe would move inward distance E as the pattern was rotated 50°, distance F when the pattern was rotated 120°, and distance G when the pattern was rotated 180°.

Having already calculated the distance of movement or depth of movement of cutting tool 28 into nozzle 10 to create the desired contour, these calculated movements of tool 28 at any point on end face 11 can be translated into distance of movement of probe 29, such as E-G discussed above. Therefore, the dimensions of the outer surface 39 of pattern 31 can be determined and pattern 31 is prepared accordingly.

Figure 3:
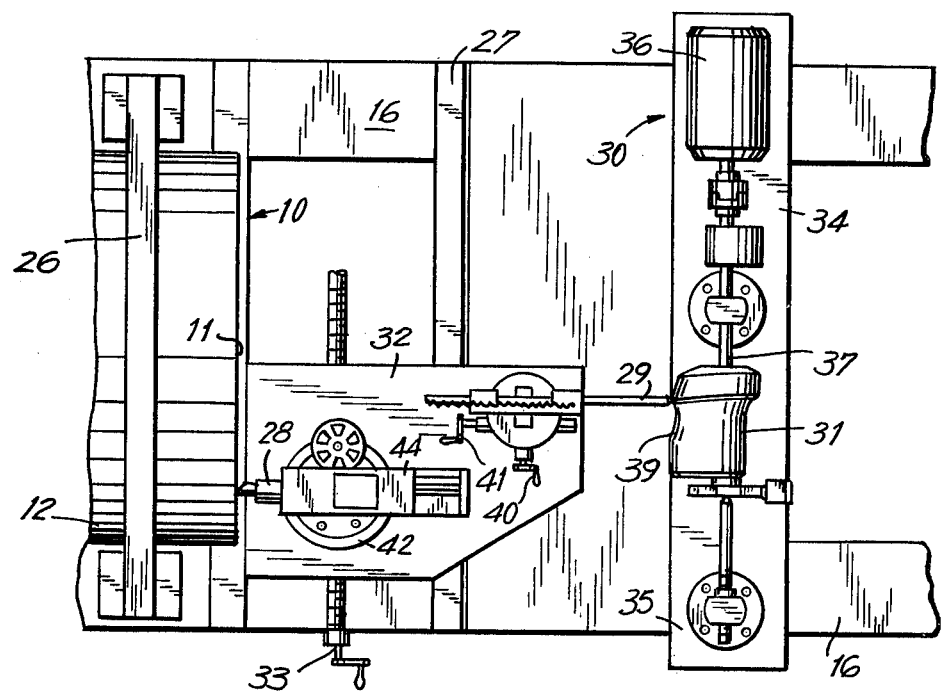
FIG. 3 is a top plan view of a portion of the apparatus shown in FIGS. 1 and 2, this view showing the particular portion enlarged for the purpose of discussion and showing the workpiece and the position of the apparatus prior to the contouring operation.

Referring to FIG. 3, pattern 31 is mounted for rotation on pattern rotating machine 30. Independent of the preparation of pattern 31 and its mounting on machine 30, nozzle 10 is mounted on lathe 14. Cross slide 32 is transversely moved between tracks 16 so that cutting tool 28 contacts end face 11 approximate the inner surface of nozzle 10, while probe 29 contacts the corresponding point on the selected outer surface 39 of pattern 31. Generally, the angle of contact of tool 28 will be the same as the angle of contact of probe 29. Preferably, both will be perpendicular to end face 11 and surface 39, but the tool may be placed at an angle between about 0° and about ±45° to the longitudinal axis of the nozzle while the probe is placed at an angle between about 90° and about ±45° to the longitudinal axis of the pattern. Preferably, the tool is placed parallel to and the probe is placed perpendicular to the respective longitudinal axes of the nozzle and pattern.

Once probe 29 is set to contact pattern 31 and cutting tool 28 is set to contact end face 11, nozzle 10 is rotated at a predetermined speed by motor 19. By rotation of nozzle 10, Selsyn generator 38 is activated and energizes Selsyn receiver 36, which rotates pattern 31. As pattern 31 rotates, probe 29 moves inward or outward causing a proportional movement in cutting tool 28 to provide a desired depth of cut in end face 11 at the particular radii from axis A—A that the cutting tool is set. After completion of the contouring operation at any particular radii in end surface 11, cross slide 32 is either manually or automatically moved for cutting at a different radii. Finally, as illustrated in FIG. 1, the contouring operation is completed as cutting tool 28 reaches the outermost diameter of nozzle 10. The cutting operation may be started at the outermost diameter and completed at the innermost diameter of the nozzle.

Several alternative steps may be made in the contouring operation. For example, as was indicated above, the movement of cross slide 32 to effect cutting of nozzle 10 at various different radii from axis A—A may be automated in synchronism with the revolution of either pattern 31 or nozzle 10. Selsyn receiver 36 and Selsyn generator 38 may be arranged so that the receiver rotates pattern 31 at a pre-selected ratio of speed to the speed of rotation of nozzle 10. In this respect, a 2 to 1 ratio of rotation of pattern 31 to nozzle 10 will produce the same contour in the upper half of nozzle 10 as in its lower half. Note that when pattern 31 shown in FIG. 4 has been rotated a second 180° that it will be back at its initial position shown in FIG. 1. Thus, after the first rotation of 180° only the top half of nozzle 10 will have been contoured. Upon rotating the pattern the second 180°, the same movement by probe 29 as with the first pattern revolution will impart the same contour in the bottom half of nozzle 10.

Figure 6:
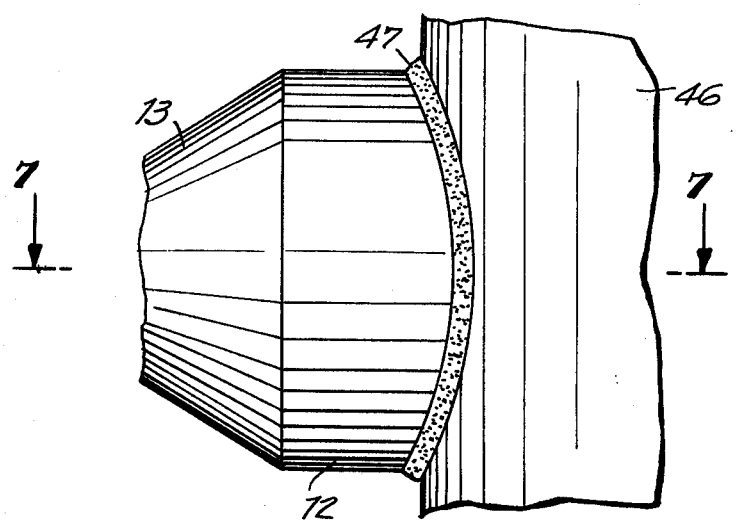
FIG. 6 is a cutaway perspective view of the workpiece shown in FIGS. 1 and 2 sealed at a right angle to a cylindrical body portion of a second device.
Figure 7:
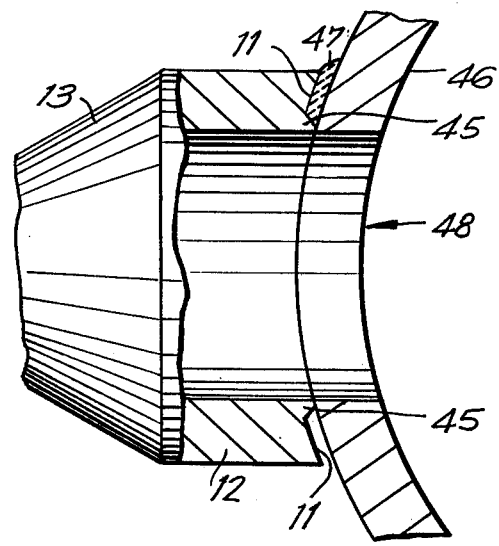
FIG. 7 is a top view of the workpiece and device shown in FIG. 6 taken along lines 7—7 of FIG. 6.

After completion of the contouring operation, end face 11 of nozzle 10 has the shape shown in FIG. 1. It should be noted that in the nozzle illustrated in FIG. 1, a ridge 45 for clamping the nozzle to the body portion of a second cylindrical device 46 has been provided. In FIG. 6, nozzle 10 is shown sealed to device 46. A sealing material 47 is placed in the space between end face 11 and the outer surface of device 46 around ridge 45 as shown in FIGS. 6 and 7. Thus, fluid delivery opening 48 provided in the body portion of device 46 may be in communication with the opening in nozzle 10 and nozzle 10 is thereby effectively mated with device 46 to prevent leakage of a fluid delivered through opening 48 into the nozzle.

What is claimed is:

1. An apparatus for contouring a surface of workpiece, comprising:

means for rotating the workpiece and the surface of the workpiece about a longitudinal axis of the workpiece, which extends through the surface of the workpiece;

a pattern; means for rotating the pattern about a longitudinal axis of the pattern;

means for synchronizing the rotation of the workpiece about the longitudinal axis of the workpiece and the rotation of the pattern about the longitudinal axis of the pattern;

a cutting tool positioned on a movable tool support; during rotation of the workpiece about the longitudinal axis of the workpiece, the cutting tool being movable towards and away from the surface of the workpiece for cutting the surface of the workpiece; the cutting tool also being movable in a plane essentially normal to the longitudinal axis of the workpiece;

a probe positioned on a movable probe support for continual contact with the outer surface of the pattern; during rotation of the pattern about the longitudinal axis of the pattern, the probe being movable towards and away from the longitudinal axis of the pattern, in accordance with a change in the distance from the point of probe contact with the pattern outer surface to the longitudinal axis of the pattern; the probe also being movable in a plane essentially parallel to the longitudinal axis of the pattern;

means for detecting the distance and direction of the probe movement towards and away from the longitudinal axis of the pattern, during rotation of the pattern about the longitudinal axis of the pattern, and for moving the cutting tool, in synchronism with the probe movement towards and away from the longitudinal axis of the pattern, a proportional distance towards and away from the surface of the workpiece, during rotation of the workpiece about the longitudinal axis of the workpiece, whereby the cutting tool cuts the surface of the workpiece;

means for moving the cutting tool in a plane essentially normal to the longitudinal axis of the workpiece;

means for moving the probe in a plane essentially parallel to the longitudinal axis of the pattern; and means for synchronizing movement of the cutting tool in a plane essentially normal to the longitudinal axis of the workpiece and movement of the probe in a plane essentially parallel to the longitudinal axis of the pattern;

whereby the cutting tool traverses the surface of the workpiece while the probe moves along the outer surface of the pattern and a single probe in contact with a single pattern directs the movement of the cutting tool to contour the surface of the workpiece.

2. The apparatus of claim 1 wherein the cutting tool is positioned at an angle between about 0° and about ±45° to the longitudinal axis of the workpiece and the probe is positioned at an angle between about 90° and about ±45° to the longitudinal axis of the pattern.

3. The apparatus of claim 1 wherein the cutting tool is positioned for cutting the workpiece at an angle 90° different than the angle at which the probe is positioned for contact with the pattern.

4. The apparatus of claim 1 wherein the cutting tool is positioned parallel with the longitudinal axis of the workpiece.

5. The apparatus of claim 1 wherein the probe is positioned perpendicular to the longitudinal axis of the pattern.

6. The apparatus of claim 1 wherein the radius of the pattern varies along its length with respect to its longitudinal axis.

7. The apparatus of claim 1 wherein the detecting and cutting tool moving means comprises a command potentiometer and an electro-hydraulic servo system and the cutting tool is hydraulically activated.

8. The apparatus of claim 1 wherein the workpiece rotating means comprises a lathe.

9. The apparatus of claim 8 wherein the movable tool support is a cross slide mounted on the lathe.

10. The apparatus of claim 8 wherein the movable probe support is a cross slide mounted on the lathe.

11. The apparatus of claim 1 wherein the pattern rotating means comprises a Selsyn generator, a Selsyn receiver, a pattern rotating shaft, and means for rotatably mounting the pattern on the pattern rotating shaft.

12. The apparatus of claim 11 wherein the Selsyn generator is driven by the workpiece rotating means and the Selsyn receiver is energized by the Selsyn generator to rotate the pattern at a speed synchronized with the speed of rotation of the workpiece.

13. The apparatus of claim 11 wherein the Selsyn generator has means for causing the Selsyn receiver to rotate the pattern at a speed different than the speed at which the workpiece is rotated.

14. The apparatus of claim 1 wherein the tool support is manually operable for repositioning the cutting tool for cutting the workpiece surface at a radii different from the radii at which the cutting tool was first positioned.

15. The apparatus of claim 1 wherein the tool support is automatically operable for successively repositioning the cutting tool for cutting the workpiece surface at successively different radii.

16. A method of contouring a surface of a workpiece, comprising:

rotating the workpiece and the surface of the workpiece about a longitudinal axis of the workpiece, which extends through the surface of the workpiece;

rotating a pattern about a longitudinal axis of the pattern;

synchronizing rotation of the workpiece about the longitudinal axis of the workpiece and rotation of the pattern about the longitudinal axis of the pattern;

positioning a cutting tool on a movable tool support; during rotation of the workpiece about the longitudinal axis of the workpiece, the cutting tool moving towards and away from the surface of the workpiece for cutting the surface of the workpiece;

positioning a probe on a movable probe support for continual contact with the outer surface of the pattern; during rotation of the pattern about the longitudinal axis of the pattern, the probe moving towards and away from the longitudinal axis of the pattern in accordance with a change in the distance from the point of probe contact with the pattern outer surface to the longitudinal axis of the pattern;

detecting the distance and direction of probe movement towards and away from the longitudinal axis of the pattern during rotation of the pattern about the longitudinal axis of the pattern;

moving the cutting tool, in synchronism with the probe movement towards and away from the longitudinal axis of the pattern, a proportional distance towards and away from the surface of the workpiece, during rotation of the workpiece about the longitudinal axis of the workpiece, whereby the cutting tool cuts the surface of the workpiece;

moving the cutting tool in a plane essentially normal to the longitudinal axis of the workpiece;

moving the probe in a plane essentially parallel to the longitudinal axis of the pattern; and synchronizing movement of the cutting tool in a plane essentially normal to the longitudinal axis of the workpiece and movement of the probe in a plane essentially parallel to the longitudinal axis of the pattern;

whereby the cutting tool traverses the surface of the workpiece while the probe moves along the outer surface of the pattern and a single probe in contact with a single pattern directs the movement of the cutting tool to contour the surface of the workpiece.

17. The method of claim 16 further comprising the step of mounting the workpiece for rotation on a workpiece rotating means.

18. The method of claim 16 further comprising the step of mounting the pattern for rotation on a pattern rotating machine.

19. The method of claim 16 wherein the pattern is rotated at a speed different from the speed at which the workpiece is rotated.

20. The method of claim 16 wherein the pattern is rotated at twice the speed of the workpiece.

21. The method of claim 16 wherein the cutting tool is positioned at an angle between about 0° and about ±45° to the longitudinal axis of the workpiece and the probe is positioned at an angle between about 90° and about ±45° to the longitudinal axis of the pattern.

22. The method of claim 16 wherein the tool support is manually moved to reposition the cutting tool for cutting the workpiece surface at a radii different from the radii at which the cutting tool was first positioned.

23. The method of claim 16 wherein the tool support is automatically moved to successively reposition the cutting tool for cutting the workpiece surface at successively different radii.

* * * * *